Figure 1:
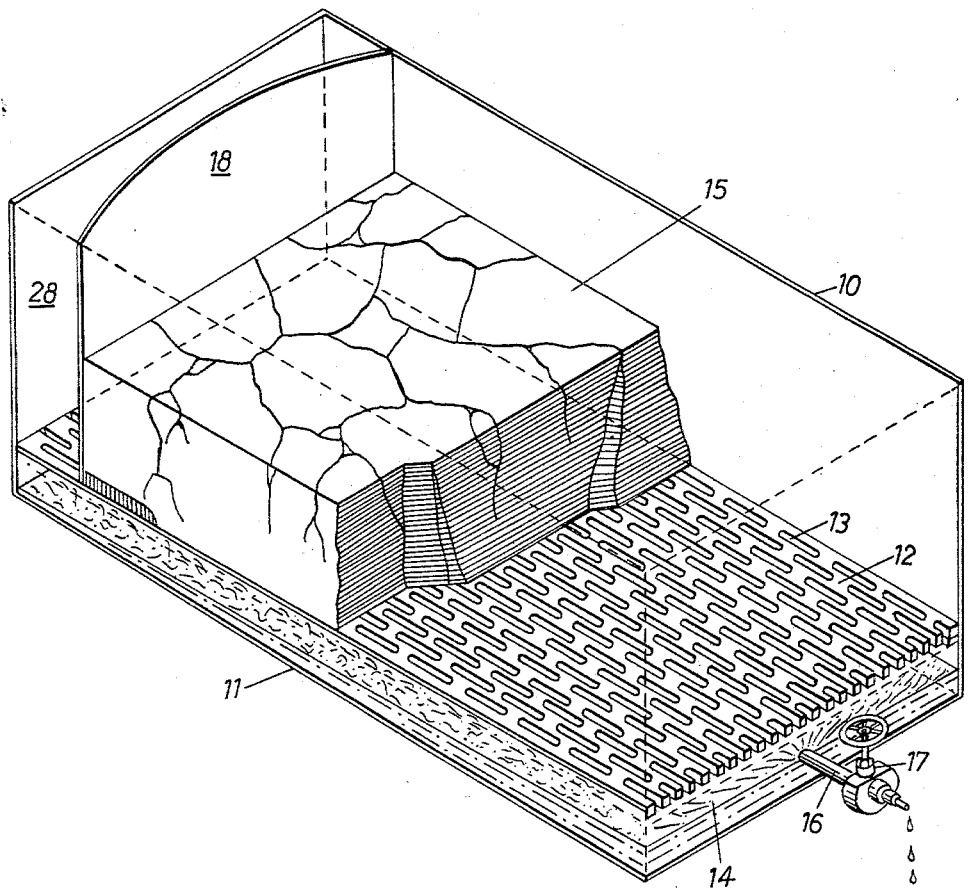

- FIG. 1 -

3,216,569
METHOD OF DEWATERING SEWAGE SLUDGE
Sydney F. W. Crundall, Woolston, Warrington, England, assignor of one-half to The British Wedge Wire Company Limited, Warrington, Great Britain, a corporation of Great Britain
Filed Jan. 10, 1962, Ser. No. 165,349
Claims priority, application Great Britain, Jan. 28, 1961, 3,360/61
1 Claim. (Cl. 210—73)

This invention relates to the dewatering of sewage sludge, and similar gelatinous dispersions, for example, papermill waste slurry, tannery waste, water works alum sludge.

In relation to sewage sludge, it has been appreciated that whilst the liquid portion of the intake into a sewage works may be purified adequately prior to the discharge thereof to water courses, the solids portion presents a serious disposal problem. The problem is simply that the solids are present in quantity, and they are of little commercial value. In consequence, a commercially applicable treatment applied thereto must be cheap.

These solids, which are obtained from the bulk of the raw sewage as primary sludges and from subsequent operations as secondary sludges, by sedimentation, are allied with very large quantities of liquid. Usually the solids contents range from only 1% to about 8% when expressed as the dry matter content of the sludge. It is therefore advisable to remove the aqueous phase in amount such as to obtain a residual "cake" which has a consistency suitable for the handling thereof as a solid. For such handling the minimum solids content may be of the order of 10%, but it is clearly preferable that the solids content should be considerably higher in order to minimise the cost of handling of the dried sludge, and the disposal thereof. Such ultimate disposal is usually by dumping. The quantity of water to be removed per ton of dry matter is usually very high indeed, e.g. a sludge containing 2% solids initially will need to have removed therefrom approximately 46 tons of water per ton of dry matter in the achievement of a "cake" having a solids content of say 25%.

Hitherto the dewatering of sewage sludges has been accomplished by spreading of the sludge, with or without what are commonly known as conditioning agents, over under-drained cinder beds to a depth of 12" to 18" whereafter the sludge is allowed to dry naturally by the lengthy operation of loss of water by evaporation and the loss of water through the under-drained cinders. Rapid drainage through the cinders is obviously advantageous. It will be clearly appreciated that such beds, in being open to the weather, cannot dry adequately and effectively in bad climatic conditions. It is true that quicker dewatering may be accomplished by the use of larger areas of cinder beds using a smaller depth of sludge, but such methods are wasteful of space and expensive to operate.

After sludge is dried on open cinder beds to the required consistency, it is lifted therefrom either manually or by mechanical devices travelling over the surface of the cinder bed. These lifting methods have the disadvantages of disturbance of the surface of the cinders in that consolidation of the cinders rendering them less porous may occur; the possibility of fracture and/or displacement of the under-drains; and the inevitable loss of cinders from the surface of the bed. There is the further disadvantage that the beds tend to become clogged with fine sludge particles which inhibit the filtration characteristics of the bed and which may develop mould growths.

Whilst the dewatering characteristics of a sludge which is to be dried in a drying bed may be improved by the incorporation therewith of a conditioning agent as mentioned above, e.g. aluminum chlorohydrate, ferric chloride, lime, and technical cerium chloride, it will be clear that the improvement due to these conditioning agents is largely off-set if the bed itself is in poor condition due to the disadvantages referred to above.

It is also known to dewater sewage sludge by mechanical methods, e.g. pressure filtration through filter presses and rotary vacuum filtration. In these methods the sludge is contacted with woven fabric sheets, through which the liquid phase passes. Again, the disadvantages of clogging of the pores is present, and the necessity for thorough cleaning of the sheets between operations is a further disadvantage.

Most of the foregoing remarks apply equally to trade waste slurry.

The present invention seeks to provide an improvement in these known techniques of dewatering of sewage sludge, whereby the abovementioned disadvantages are minimised or even avoided.

Accordingly this invention provides a method of increasing the solids content of sewage sludges comprising the step of contacting the sewage sludge with a metallic perforate member or a non-woven non-metallic perforate member whereby to retain a substantial proportion of said solids.

According to an embodiment of this invention, there is provided a method of increasing the solids content of sewage sludges comprising the step of contacting the sewage sludge with a perforate member which is substantially immersed in a liquid phase.

According to a particular feature of the invention the sewage sludge which is contacted is a non-conditioned sludge. It may be desirable in the concentration of certain sludges to add a conditioning agent thereto, and in some cases, such addition may even be essential if a good result is to be attained.

In the preferred embodiment wherein the perforate member is substantially immersed in a liquid phase, it is desirable to employ water as the liquid phase. This liquid phase may be referred to as "support water" although media other than water may be employed, for example, a thin sludge or waste water. In the latter eventuality, it is necessary to consider the final destination of the liquid removed from the sludge insofar as a discharge to say a water course, may have to comply with certain purity levels. This method is particularly suitable in the concentration of sludges of thin and gelatinous nature. It has also economic advantages in that the perforations in the perforate member may be larger than they could be otherwise for successful concentration.

The apparatus used to practice the method of the invention comprises a metallic perforate member or a non-woven non-metallic perforate member or it may comprise a perforate member which is substantially immersed in a liquid phase, the member being supported in a horizontal position and operating for example as a false floor above an inclined base of a separating tank or bed. It may also comprise the perforate member above referred to, disposed as a conveyor belt for ease of discharge or for passage around a conventional continuous vacuum filter system, or again it may be disposed in a vertical or substantially vertical manner as a component of a conventional filter press.

Conveniently the perforate member comprises a flat sheet like body in which the perforations may take the form of elongated slots of small relative width, circular holes or apertures of a mesh-like character. In the case of slots, the width may be of the order of 0.039 inch (1 millimetre) and the length up to 3", and the total area occupied by the apertures in any given area may be of the order of 20%. In the case of circular holes, preferred diameters lie between 0.059 inch (1.5 mm.) and 0.005 inch (⅛ mm.), particularly 0.2 inch (0.5 mm.) and the open area should preferably be above 5% of the total area of the member and may be up to 50%. 0.02 inch is a particularly suitable diameter. Where a mesh is involved, each aperture should be such as to fall within the above range.

Whilst the foregoing dimensions are quoted merely as examples, it will be clearly obvious that where a perforate member is used which is of considerable thickness, the diameter of the selected aperture must be large enough to avoid capillary action therethrough.

The material from which the perforate member or false floor is constructed should be a suitably corrosion resistant material, e.g. suitable metals, reinforced or laminated synthetic resinous plates or wire mesh. It should be of high mechanical strength and possess a relatively plane surface over at least the major part of its superficial area.

The plate-like members of the invention may be used in conjunction with drying or separating beds by insertion thereof in place of the cinder layer in suitably supported manner. The sewage sludge is then disposed over the platelike member, whereupon the liquid phase passes through the aperture to a receptacle, e.g. a tank below, leaving the solids content upon the plate. After drying either manual or mechanical methods of lifting the partially dried "cake" from the plate-like member may be employed.

It is preferable to dispose the sewage sludge over a plate-like perforate member or false floor not necessarily of metallic or non-metallic non-woven nature, when the member is immersed in a liquid phase. The sludge, on charging thereto, spreads evenly over the surface of the liquid phase, and on draining of the liquid phase, a speedy drainage of the sludge occurs.

The invention will now be further described by reference to the accompanying drawings in which:

FIGURE 1 is an isometric projection of a filter bed unit which incorporates a perforate member according to the present invention.

Figure 2:
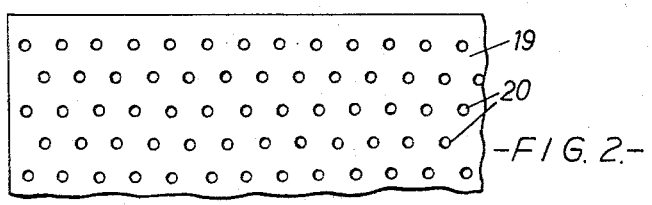
Figure 3:
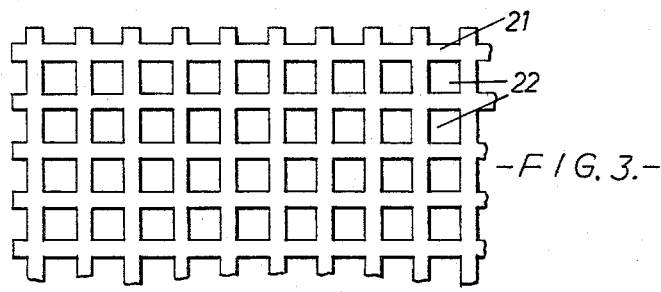
Figure 4:
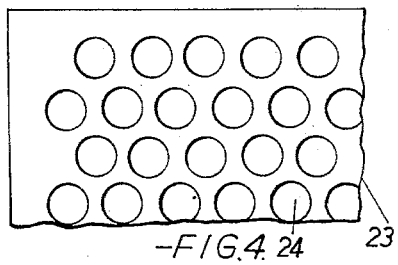
Figure 5:
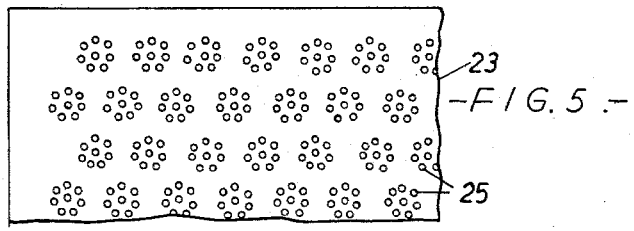

FIGURES 2–5 each illustrates a detail of a variant of the perforate member as shown in FIGURE 1, FIGURE 2 illustrating the circular hole embodiment, FIGURE 3 the mesh embodiment, FIGURE 4 illustrating one side of a commercially available ceramic, which is moulded to give a multiplicity of tapered internal cavities each of pepper pot configuration, and FIGURE 5 showing the reverse side of the ceramic element of FIGURE 4.

In the construction according to FIGURE 1 a filter tank or vessel 10 has a base 11 which is inclined sufficiently to promote drainage, such as for example with a fall in the region of 1 in 35 from end to end. A filter floor or sieve 12 which is supported to lie horizontally above the inclined base 11, and thus in effect forms a false floor, comprises a perforate member in the form of a flat sheet-like metallic body having elongated slots or apertures 13 of small relative width therein and which are disposed in staggered relationship, the apertures being so arranged as to be of sufficient number and size to effect dewatering whilst not reducing substantially the structural strength of the body member 12 as a whole.

The cake or solids content of the sludge is shown at 15 while an externally connected pipe or other conduit 16 having a manually operable valve or cock 17 is located at that end of the tank having the lower end of the sloping base 11 so as to serve the dual purposes of enabling the tank to be filled with water 14 to the level of the horizontal floor 12 or slightly above it and also to enable effluent separated from the sludge to pass away at a controlled rate either for direct discharge from the works at which dewatering is effected, or for further treatment as may be necessary.

A displaceable vertical wall or bulkhead 18 forms an end wall for that part of the tank above the perforate member 12 constituting the false floor on which the solids content of the sludge accumulates. This wall or bulkhead 18 may itself be formed similarly to the floor 12 in which event the space at 28 on the opposite side of the wall, and which also has a false base constituted by a continuation of the horizontal floor 12, may be utilised to assist in the separation of the liquid content of the sludge and also the removal of any supernatant liquid which might otherwise lie on the upper surface of the solid sludge 15. In this respect if desired the fixed walls of the tank similarly may be perforated with the space in rear of the walls in communication with the space below the perforated horizontal floor 12.

In operation sewage sludge, preferably conditioned, is led into the tank 10 in which the false floor 12 is immersed in support water 14. When the sludge has reached a given depth, which depth is usually determined on the basis of previous experience with the particular sludge being dewatered, the support water is withdrawn and the sludge is allowed to drain and form the cake 15. The support water and the liquid from the sludge which drains through the slots 13 is removed by gravity. The solids remaining on the floor 12 lose further moisture by evaporation and are eventually removed from the member manually by shovels, or by hand forks or by mechanical means.

Whilst this figure illustrates the employment of water as the liquid phase, the use of support water is not essential to the successful concentration of some sludges, e.g. primary sludge.

FIGURE 2 illustrates a plastic sheet-like body 19 in which are spatially arranged circular apertures 20.

FIGURE 3 refers to a modified false floor consisting of a stamped-out metallic mesh 21 having apertures 22 of size 0.022 inch (0.5 mm.).

FIGURES 4 and 5 refer to reverse views of a ceramic element 23 which is commercially used as a floor tile in industrial applications, for example, a malt kiln. Such a ceramic element has tapered internal tubular spaces moulded therein each of which terminate at the one side, in a single relatively large aperture 24, and at the other side, in a plurality of relatively small apertures 25.

It will be appreciated that each of the false floor variants described above and illustrated in FIGURES 2, 3, 4 or 5, may be employed in place of the floor illustrated in FIGURE 1.

The invention will be further described by way of a small scale experiment in which a metal perforate member one square foot in area having apertures 0.8 millimetre by 60 millimetres and a total aperture area of about 20% was used. It was enclosed in a wooden frame of sufficient depth and supported about 1" above the surface of a metal tray whereby to allow free drainage of the water under the perforate member. The perforate member was kept immersed in water during the charging period. 18 litres of an elutriated digested sludge at 4% dry matter content (as is normally produced from a mixture of raw primary and surplus activated sludge) were conditioned with aluminium chlorohydrate and poured on to the perforate member. Drainage of free water was substantially complete in 12 hours and on complete drying, over 95% of the original solids was recovered.

The invention will also be further described by way of pilot scale experiments using, as the perforate member, a structure made up of a plurality of spaced parallel metallic wires and water as the "support water" on varying types of sewage sludge and a paper mill slurry, on an experimental drying bed unit.

CONSOLIDATED SURPLUS ACTIVATED SLUDGE

| Depth of running on | Conditioning percent Al₂O₃ on Dry Solids Applied of sludge | Mesh of membrane, mm. | Percent of applied Dry Solids retained on perforate member | Percent D.M. as applied | Percent D.M. as thickened | Time Interval | Analysis of First Flushing of underdrainage in terms of p.p.m. | | | Quantities, Approximate | |
|---|---|---|---|---|---|---|---|---|---|---|---|
| | | | | | | | S.S. | O.A. | B.O.D. | Support water, gals. | Sludge applied, gals. |
| 6.75" | 3.0 | .5 | 100 | 2.5 | 8.1 | 41 hrs | | | | 8.2 | 16 |
| 5.75" | 3.26 | .5 | 99 | 2.03 | 6.6 | 12 hrs | 64 | 121 | 210 | 8.8 | 13.6 |

FRESH SURPLUS ACTIVATED SLUDGE

| Depth of running on | Conditioning percent Al₂O₃ | Mesh mm. | Percent retained | % D.M. applied | % D.M. thickened | Time Interval | S.S. | O.A. | B.O.D. | Support water | Sludge applied |
|---|---|---|---|---|---|---|---|---|---|---|---|
| 5.75" | None | .5 | 91 | .60 | 6.5 | 16½ hrs | 1,220 | 122 | 390 | 9.0 | 11.9 |
| 6.0" | 1.34 | .5 | 90 | .65 | 5.0 | 19 hrs | 188 | 36 | 175 | 9.1 | 13.7 |
| 6.0" | None | .5 | 94 | .77 | 6.2 | 12 hrs | 370 | 52 | 350 | 8.9 | 14.5 |

DIGESTED SLUDGE (PRIMARY AND SURPLUS ACTIVATED SLUDGES)

| Depth | Cond. | Mesh | Retained | D.M. applied | D.M. thick. | Time | S.S. | O.A. | B.O.D. | Support | Sludge |
|---|---|---|---|---|---|---|---|---|---|---|---|
| 5.0" | 3 | .5 | 95 | 2.9 | 5 | 20 hrs | 128 | 40 | 70 | 8.81 | 11.5 |
| 9.0" | None | .25 | 98 | 3.5 | 9.3 | 11 days | 134 | 42 | 100 | 7.2 | 20.1 |

PRIMARY SLUDGE

| Depth | Cond. | Mesh | Retained | D.M. applied | D.M. thick. | Time | S.S. | O.A. | B.O.D. | Support | Sludge |
|---|---|---|---|---|---|---|---|---|---|---|---|
| 9.0" | 1.36 | .75 | 99 | 8.5 | 25 | 14 days | 248 | 88 | 1,460 | 6.5 | 19.0 |

HUMUS SLUDGE

| Depth | Cond. | Mesh | Retained | D.M. applied | D.M. thick. | Time | S.S. | O.A. | B.O.D. | Support | Sludge |
|---|---|---|---|---|---|---|---|---|---|---|---|
| 9.0" | None | .25 | 92 | 2.4 | 5.9 | 5 days | 1,006 | 167.2 | 460 | 7.71 | 19.91 |

PAPER MILL SLURRY

| Depth | Cond. | Mesh | Retained | D.M. applied | D.M. thick. | Time | S.S. | O.A. | B.O.D. | Support | Sludge |
|---|---|---|---|---|---|---|---|---|---|---|---|
| 7.0" | (¹) | .5 | 95 | 2.5 | 26.0 | 72 hrs | 144 | | | 8.6 | 15.9 |

¹ Unconditioned.

Further data using synthetic resinous material having circular holes therein, as illustrated in FIGURE 2 is as follows:

A small scale experiment using conditioned surplus activated sludge of dry matter content 0.8% (the conditioning agent was aluminum chlorohydrate used in amount of 1.5% $Al_2O_3$ on dry matter) which was charged to a synthetic resinous member having circular holes of 0.021" diameter and immersed in support water, resulted in an 81.1% retention of solids thereon, and the production of a cake of solids content 5.2% over a period of 15 hours.

The invention has the advantages that the perforate members may be cleaned after each operation and do not diminish markedly in efficiency with use.

It will be appreciated that variations and modifications may be made without departing from the scope and spirit of the invention as set forth in the appended claim. The specification and drawings, accordingly, are to be regarded in an illustrative rather than in a restrictive sense.

I claim:

A method for separating the dispersed solids of a sludge from the liquid constituent thereof in a tank having a perforate false bottom spaced from the bottom of the tank, comprising introducing a substantially clear liquid into the tank at least up to the level of the top surface of said false bottom, introducing sludge onto the surface of the liquid in the tank above the perforate false bottom, allowing settling of solids from the sludge to initiate the forming of a body of retained solids on said false bottom which bridges the perforations of the latter and, after the accumulation of said retained solids up to a predetermined depth, removing liquid from below the perforate false bottom at a controlled rate to avoid breakthrough of said body of retained solids on the false bottom.

References Cited by the Examiner

UNITED STATES PATENTS

| | | | |
|---|---|---|---|
| 596,540 | 1/98 | Potter | 210—498 |
| 1,537,818 | 5/25 | Griffith | 210—455 X |
| 1,940,952 | 12/33 | Hutchens | 210—498 |
| 2,259,688 | 10/41 | Genter | 210—10 X |

FOREIGN PATENTS 21,355   1900   Great Britain.

REUBEN FRIEDMAN, *Primary Examiner.*

HERBERT L. MARTIN, *Examiner.*